United States Patent [19]

Otala

[11] 3,905,040

[45] Sept. 9, 1975

[54] MAGNETIC DOMAIN STORAGE DISK

[75] Inventor: Matti Nillo Tapani Otala, Oulu, Finland

[73] Assignee: U.S. Philips Corporation, New York, N.Y.

[22] Filed: Jan. 16, 1974

[21] Appl. No.: 433,821

[30] Foreign Application Priority Data

Feb. 12, 1973 Netherlands ...................... 7301932

[52] U.S. Cl. ............ 360/59; 360/135; 340/174 TF; 340/179 YC; 340/174 AN; 340/174 VA

[51] Int. Cl.[2] ...................... G11B 7/02; G11C 11/14

[58] Field of Search ............... 340/174 TF, 174 YC; 360/59, 114, 97, 135

[56] References Cited

UNITED STATES PATENTS 3,793,639 2/1974 Enz et al. ...................... 340/174 TF

*Primary Examiner*—James W. Moffitt
*Attorney, Agent, or Firm*—Frank R. Trifari; Simon L. Cohen

[57] ABSTRACT

A storage system uses a plate of magnetic material having a two-dimensional regular array of positions in which a domain can each time be written and read by light radiation. The plate rotates at a uniform speed, while positioning members can be selectively controlled in the radial direction. The light is generated, for example, by a laser.

9 Claims, 7 Drawing Figures

MAGNETIC DOMAIN STORAGE DISK

The invention relates to a storage system, comprising a plate of magnetic material in which digital information can be stored in the form of domains, under the influence of the thermal action of electromagnetic radiation which is transported by write means, in a number of positions determined by magnetically active elements, furthermore comprising means for maintaining a magnetic bias field whose magnitude determines the domain dimensions, and furthermore comprising read means. A storage system of this kind is described in the previous Netherlands Patent Application 7,203,555 corresponding to U.S. Patent application Ser. No. 340,229, filed Mar. 17, 1972, and now U.S. Pat. No. 3,824,570 in the name of Applicant. This Application concerns a device for converting image information into magnetic information which is incorporated in a domain pattern. The information is applied to an output in series form. In this context "domain" is to be understood to be a so-termed "magnetic bubble", i.e. an area in the plate which, when a given magnetic field is applied transverse to the plate, has a magnetization direction which opposes that of said magnetic field. It can have the shape of a disk, a ring, a strip or a halter. Domains of this kind are very suitable for the storage of digital information, inter alia because at a given shape its dimensions are dependent only on the magnitude of the magnetic bias field and of the material parameters. It was found that less severe requirements can thus be imposed as regards the write and read means, and also as regards the constancy of the magnetic bias field. The garnets and orthoferrites are suitable materials in this respect. According to said U.S. Pat. No. 3,824,570 reading is time-consuming, even if only a part of the information is used. An additional drawback of such plates is the fact that the manufacturing process can introduce contaminations in the plate material. It is difficult or even impossible for moving domains to pass such a location. In that case a substantial part of the information may be unusable. According to the invention, these drawbacks are eliminated in that the invention is characterized in that drive means are provided by means of which said plate, arranged on a rotatable disk, can be rotated at an at least substantially uniform speed, the write means, and also the read means by means of which electromagnetic radiation can be transported as the read medium, comprising positioning members by means of which the radial position of a domain on said disk can be selectively addressed. Part of the information can thus each time be quickly read out because the read means are radially positioned and the disk rotates at a substantially uniform speed. The movement is relative: the plate may alternatively be stationary, while the write and read means rotate. Because the domains do not move in the plate, they are not influenced by contaminations. A contamination can be so serious that one of the said predetermined positions becomes unusable. Steps to counteract this phenomenon are known to be taken in many digital stores. Because the plates are allowed to contain magnetic material contaminations, the manufacturing yield is increased, at the same dimensions, and the plates will be cheaper.

Because, in addition, the positioning means can be used for both storage and reading, a simple configuration is obtained.

The storage of selectively readable information in tapes and plates of magnetic materials is known. This does not relate to the said "magnetic bubbles", so that the achievable information density is much smaller than that which can be achieved according to the invention. Furthermore, it is known to store analog information in the form of the dimension of magnetized areas. This has the drawback what a variable space may be required per information: the dimensions of the available space must then be large. The invention utilizes fixed positions for digital storage, which offers many advantages such as a high information density, fast accessibility, and an intrinsic low susceptibility to interference. Further advantages are a high manufacturing yield and low energy requirements for reading and writing (will be discussed hereinafter). A storage disk is thus obtained, and this disk-like configuration is very much appreciated in computer systems (but then with the known, much smaller information density). With respect to a known storage disk, in which the information is contained in a fixed pattern of recesses in the non-magnetizable surface, the invention offers the advantage that information can be written in a reversible manner.

It is an advantageous aspect of the invention that said plate comprises recesses in the layer of magnetic material which constitute, together with said positions, a regular array which is arranged according to at least substantially circular tracks, said recesses being arranged according to centering tracks, centering means being provided by means of which electromagnetic radiation can be projected onto said centering tracks and can be detected after reflection. The reflected light is influenced by the relative position of the centering tracks, and hence a control loop can be readily formed by the centering means.

It is a further advantageous aspect of the invention that positioning means with a logic member are provided, it being possible to supply said reflected electromagnetic radiation to said logic members, and said radial position being addressable thereby. The logic member comprises, for example, a track counter so that a predetermined track can be readily addressed.

It is a further favourable aspect of the invention that said means for maintaining a magnetic bias field comprise a layer of permanent magnetic material which is provided on said plate of magnetic material. Such a bias field can be generated by an external permanent magnet; however, the advantages of such a provided layer are many. If the plate is removable, its low weight is advantageous. If the plate rotates in the storage system, there will be no additional balancing problems. Furthermore, the direction of the bias field will then always be accurately the same. Finally, a very homogeneous bias field can thus be realized. Such a layer of permanent magnetic material is known from the article "Thin-film Surface Bias on magnetic Bubble Materials" by T.W. Liu et al, J. Appl. Phys., 42 (1971) 1360. The relevant layer consisted of vapor-deposited material. It was found that the externally generated, for example, by means of a coil, bias field can be reduced by 69% by a suitably chosen layer. Moreover, this concerned an experiment with moving domains where, as already explained, the requirements are more severe. Further improvements can be achieved by improved adhesion of the vapor-deposited layer to the plate of magnetic material or more suitable materials. At the experiment, the "collapse" field was found to be 38 and 15 Oersted, respectively, and the operating field was 35 and 11 Oersted, resectively. In the vicinity of the operating field there is a region in which the domains are properly shaped. In the case of a high field, there will be collapse, while in the case of low field the domains will run-out.

Another article, "Cylindrical Magnetic Domain Propagation in $Sm_{0.55}Tb_{0.45}FeO_3$ Platelets Possessing High Surface Coercivity" by P. P. Luff and J. M. Lucas, J.Appl. Phys. 42 (1971) 5173, describes that the layer can be generated by a given method of polishing. Both described methods can be combined. It is to be emphasized that in such configurations the bias field does not substantially extend beyond the plate of magnetic material/additional layer. Even if the magnetic field generated by the permanent magnetic layer should not be sufficient to maintain the domains, it is still advantageous because much lower requirements can then be imposed as regards uniformity of an additional external field.

The said magnetically active elements advantageously contain dot-like soft-magnetic material provided on the plate of magnetic material. This results in properly defined preferred positions. According to U.S. Pat. No. 3,824,570, the positions are realized as elements of a domain displacement structure, for example, a vapor-deposited T-bar pattern of permalloy. In addition to objections as regards the displacement of the domains, a pattern of this kind requires substantial space. The dot-like elements enable higher information density: the transverse dimensions thereof need not be large with respect to the domain diameter; this is in contrast with the T-bars. Furthermore, they can be readily deposited and they cause little interference with the write and read means.

It is a further advantageous aspect of the invention that the operating temperature of said plate of magnetic material lies below its compensating temperature, said storage means comprising a preheater and a light source which can be modulated, the said light source not being capable but said light source and preheater together being capable of locally raising the temperature to the compensating temperature. As will be described hereinafter, domains can thus be readily formed as information carriers. Another solution to the same problem is that where the operating temperature of said plate of magnetic material is below its compensating temperature, said storage means comprising a magnetic field generator and a light source which can be modulated, where the temperature of the plate of magnetic material can be locally increased to the compensating temperature which is dependent of the magnetic field strength by cooperation of the additional magnetic field generated by the magnetic field generator, counteracting the magnetic bias field, and the radiation of said light source.

The invention also relates to a storage disk for use in a storage system according to the invention, the storage disk being removable from the storage system, together with the means incorporated therein for maintaining the magnetic bias field, the storage disk comprising mechanical centering means which cooperate in a centring manner with non-removable second centering means of the storage system. The storage disk can thus be readily exchanged.

The invention furthermore relates to a storage cassette intended to be used in a storage system according to the invention, the cassette being removable together with the means for maintaining a magnetic bias field in the interior thereof which are incorporated therein, and in which a storage disk is present in which domains can be formed. As a result, the presence of a proper, homogeneous bias field is alwways ensured and an attractive "bubble cassette disk" is obtained.

The invention will be described in detail with reference to some Figures.

Figures 2, 3:
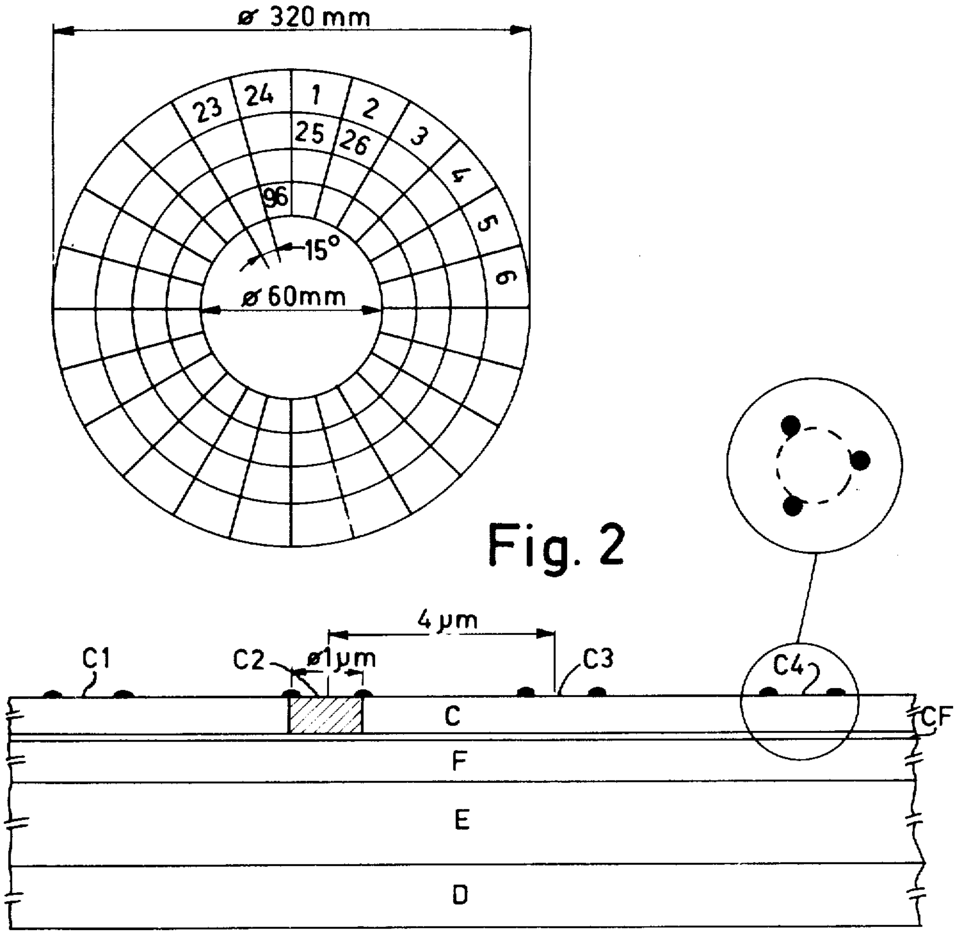
FIG. 2 shows an organization of a storage disk to be used in a storage system according to the invention.
FIG. 3 is a cross-sectional view through a storage disk according to FIG. 2.
Figure 5:
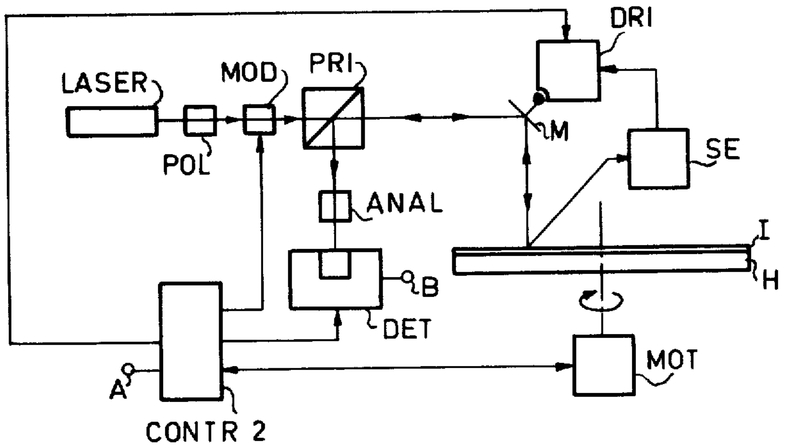
FIG. 5 shows a storage system according to the invention.

FIG. 2 shows an organization of a storage disk to be used in a storage system according to the invention. The disk comprises a number of plates of magnetic material 1, 2 . . . 96 in which domains can be formed. It was found to be easier to manufacture small plates of magnetic material and to arrange these on a carrier disk. It is advantageous if the boundaries between adjoining plates always lie at the same angles and radii: these locations can be stored in a special control store as being non-addressable. The number of plates and the dimensions of the disk are given merely by way of example. The disk is rotated in a storage system according to the invention at a uniform speed, positioning being step-wise effected in the radial-direction. The disk can be centered in that a central opening or a central pin is provided in its center which can cooperate in a centering manner with a corresponding part of the storage system (FIG. 5).

FIG. 3 is a sectional view, not to scale, through a storage disk as shown in FIG. 2, a carrier layer D having a thickness of 2–5 mm being provided for reinforcement. This layer is made, for example, of a known polymer. The substrate layer E has a thickness of 100–200 $\mu$m. This layer provides adhesion between the layers D and F. The layer F is made of a permanent magnetic material having a high Curie temperature, and maintains an adequate magnetic field within the layer C of magnetic material so as to maintain any domains. Layer C has a thickness of 1–2 $\mu$m. and comprises preferred positions for the domains, for example, the shaded domain at position C2, which are situated a few domain diameters apart. The domain diameter is, for example, 1 $\mu$m. and the spacing is 4 $\mu$m. A bit information then requires a surface area of 16 $\mu m^2$. The preferred positions are formed by vapor-deposited soft-magnetic material, for example, permalloy. This can have the shape of one dot which is centrally provided in the preferred position, or a number of dots, for example 3, which are provided on a circle, the diameter of which corresponds to that of the domains (see the insert of the Figure, representing a plan view). Local influencing of the material properties is alternatively possible by selective diffusion or by bombardment with fast charged particles (ion implantation). Finally, the layer C can be locally thickened. The active surface area of the disk according to FIG. 2 is approximately 800 $cm^2$ so that it has a capacity in the order of 2 × $10^9$ bits. Preferred positions can be provided after provision of the plates of magnetic material on the disk of FIG. 2. The tracks can then be centrically arranged about the center of the disc. Layer C is transparent in a given wavelength region. Between the layers C and F a reflective layer can be provided to serve for detection of the domains by reflection. Such a plate can be usable on both sides if a sequence of layers E–F –(CF)–C is provided on both sides. A protective layer can be provided on layer C.

Figure 4:
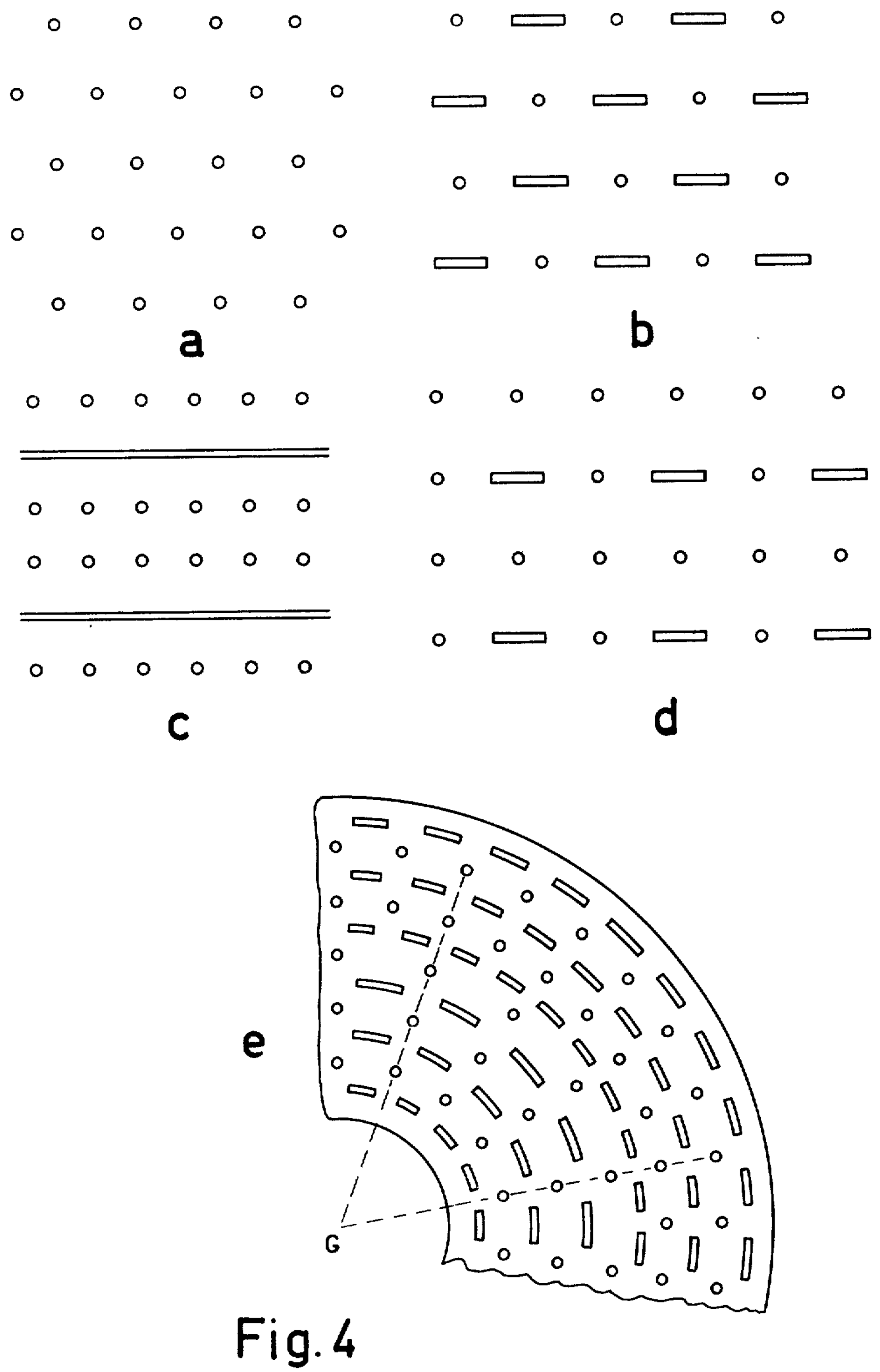
FIG. 4 shows examples of two-dimensional arrays of positions.

FIG. 4 shows examples of two-dimensional patterns of positions. The positions are denoted by circles. First an hexagonal pattern of positions (a) is given for a disk having a very large radius, so that the curvature is negligibly small. This pattern offers the highest packing density. On a storage disk of smaller radius, the rows of positions form circular tracks or one or more spiral-shaped tracks, the pitch of which is small with respect to the radius. Case (b) shows additional strip-like recesses for the centering and positioning to be discussed hereinafter: the preferred positions and the recesses are alternately situated on the same, in this case horizontally shown, tracks. Case (c) shows that there may be separate tracks on which the elongate recesses for accurate positioning are situated. The elongate recesses can extend into each other such that a single groove is obtained. Case (d) shows that there may be tracks comprising preferred positions and elongate recesses, and tracks containing only preferred positions. Finally, case (e) shows a sector of a storage disk as shown in FIG. 2. The positions denoted by circles are situated on concentrical circles. On the inner three circles thereof, the positions are situated on a number of lines which depart from the center G and which each time enclose a fixed angle with respect to each other. As a result of the available space, this angle can be halved for the outer two circles. The elongate recesses are situated on the intermediate circles.

The foregoing can be extended yet in that analog or digital information (i.e. fixed information) is contained in the longitudinal dimensions of the elongate recesses. This information concerns, for example, the address code of a track.

FIG. 5 shows a diagram of storage system according to the invention, comprising a control unit CONTR2, having a signal input A, a light source LASER, a polarizer POL, a modulator MOD, a prism PRI, an adjustable mirror M, an adjusting unit DRI, a position-determining unit SE, a storage disk as shown in FIG. 2, comprising the layer I in which a domain can be formed and further layers H, a drive unit MOT, an analyzer ANAL, a detector DET, and a signal output terminal B.

The read procedure will first be described. To this end, the signal input A receives address information which specifies a given radial position (or a number of positions) on the storage disk. The address information signals are applied to the adjustable mirror M by means of which a light beam can be digitally deflected over a predetermined angle. The detector DET receives clock pulse information from the control unit CONTR2: detection in synchronism with the passing of the domain positions is thus possible.

The light source LASER continuously radiates light which is polarized by the polarizer POL and which is modulated in intensity by the modulator MOD under the control of the control unit CONTR2. The polarized and modulated light reaches the storage disk I/H, via the prism PRI and the adjustable mirror M, and is subjected to Faraday rotation in the layer I in accordance with the presence or absence of a domain in the relevant location, is reflected at the interface of the layers I and H, and reaches the detector DET via the adjustable mirror M, the prism PRI which comprises a semi-transparent reflective layer which is arranged according to the diagonal shown, and the analyzer ANAL. The storage disk is rotated at a substantially uniform speed by the drive unit MOT. The units MOT and CONTR2 form a control loop with the result that the modulation signals of the device CONTR2 applied to the modulator MOD correspond to the positions on the storage disk I/H in which domains are present. The adjusting unit DRI receives signals from the control unit CONTR2, with the result that it is adjusted to the correct track (FIG. 4): this is the coarse adjustment. The adjusting unit DRI furthermore receives signals from position-determining unit SE, with the result that fine adjustment is possible. This adjustment can relate to both the distance from the disk as well as to the fine adjustment to the correct track: a control loop is thus formed again. The polarization plane of the light rotates in the plate I/H in accordance with the presence or absence of a domain in the irradiated position: the directions of the Faraday rotation are thus opposed. The analyzer plate ANAL allows substantially complete passage of light of a given first polarization direction, and substantially completely blocks light having a second polarization direction which is perpendicular thereto. This direction is so chosen with respect to the polarization direction of the light from the light source LASER which is allowed to pass by the polarizer plate POL that sufficient contrast occurs between the transmitted amounts light upon passage along a point where a domain is present and a point where no domain is present. The unit DET can incorporate a clipping device by which a binary O-signal or 1-signal can be generated: this signal appears on the signal output B. Because the storage information is digital, a given region remains available for the signal amplitude which is to be recognized as "1" or "0" by the detector DET. As a result, for example, a given tolerance is present for the light yield of the light source LASER. The same applies to the other components of the storage system.

The operation of the storage system is analogous during the write procedure, with the exception of the analyzer ANAL and the detector DET. Let us assume that no domain is present. The light source LASER now introduces a quantity of energy in a given position of the system of positions (FIG. 4).

This quantity is larger than in the case of reading. This can be realized in various ways, for example, by a lower rotary speed of the plate in cooperation with longer shutter times of the modulator MOD, by means of an adjustable attenuator which can be arranged between the light source LASER and the prism PRI, or by means of a stronger light source.

If the temperature approximates or exceeds the compensation point during heating, for example, over a few tens of degrees, a subsequent temperature decrease can cause spontaneous formation of domains in illuminated locations. The materials which are suitable for the formation of domains usually, comprise two magnetizable (crystal) sub-lattices; each of these lattices has its own Curie temperature above which the magnetization is lost: the Curie temperatures are usually high, for example, approximately 200°C. The magnetization behavior of the sub-lattices may differ, and at a given temperature the magnetization of the two sub-lattices may be the same and opposed, so that they cancel. Domains can then spontaneously appear. The compensation temperature may be lower, for example, 0°–50°C. By a suitable choice of materials, a volume of, for example, 10 $\mu m^3$ can then be heated over 15°C per domain in order to generate the domain. As previously stated, the dimensions of the domains are dependent only of the external magnetic field and the material parameters. The required write energy, consequently, is minimum, but the limit in the upward direction is ample; consequently, the energy from the light source LASER need not be accurately constant. Using a light source of a few milliwatts, a sufficiently high write speed (bit rate) can thus already be obtained. When the temperature decreases below the compensation point, the domains remain bound to the preferred positions, or they move to the nearest preferred position (if they were not formed exactly on such a position). As a result, the write positioning may be less accurate. Finally, compensation point writing offers the advantage that writing can be very quickly performed as a result of the small quantity of energy required. As a result, the effect of heat conductivity is negligibly small, so that only a single domain position can be heated. Therefore, the heating does not influence the information in neighboring domain positions. Further advantages of this limited heating are: little thermal stresses, little diffusion of the atoms through the crystal lattice, little precipitation from unstable alloys.

Analogous to the foregoing, a preheater can be used for temperatures just below the compensation temperature, the light source LASER operating in the same way as for reading. The preheater may be a high-frequency induction coil. A change-over can thus be readily made from reading to writing. The preheater has been omitted in the drawing for the sake of simplicity.

Another possibility is the local counteracting of the bias field by an additional magnetic field: a domain can then be more readily created by means of the temperature increase caused by the light source LASER; this is because the magnetization energy is then smaller. Because the magnetic field is smaller, the magnetization energy of each of the said two sub-lattices is smaller. The bias field can be reduced by means of a simple coil.

Domains can be erased in that they are annihilated by a local additional magnetic field (collapse field) in the same direction as the bias field. Increased temperature reduces the magnetization energy, so that the annihilation is facilitated. The temperature increase can be realized by the light source LASER or by an additional light source as already described. When suitably adapted, one additional magnet coil can thus be used for both writing (introducing new domains) and erasing (annihilation of existing domains). In the case of writing, the additional magnetic field must disappear before the increased temperature, while in the case of erasing the additional magnetic field must disappear after the increased temperature. This can be realized by reversing the direction of rotation. Selective erasing of domains also enables a write operation to be performed, for example, when all said positions are occupied by a domain.

There are three methods of modifying stored information:

a. radiation of light: high resolution can thus be obtained in two directions, so that each position can be separately addressed;

b. influencing the magnetic field; magnetic heads are known in which, as a result of a narrow gap, the head has a high resolution in the direction transverse to the gap; this is usually lower in the longitudinal direction;

c. heating by means of an induction coil; in this case no high resolution will be achieved. Eddy current heating in the permalloy can sometimes also benefit heating.

Radiation of light is usually most suitable for the separate addressing of the bits, as described above, possibly in combination with one of the other mechanisms. The other two methods are suitable for the combined addressing of a number of bits (for example, inthat a magnetic head is used which comprises a gap extending in the direction of the relative movement with respect to the storage plate).

The preheater need not act exactly on the addressed position: it is alternatively possible to heat first and to use the second means (light or magnetic field) within the relaxation time of the temperature distribution: within this time the heated location must move to the magnetic head or to the beam of the light source, respectively.

FIGS. *6a* and *6b* show a device by means of which the detection unit can be centered on the correct track. Let us assume that the recesses in the plate of magnetic material are organized according to case b) of FIG. 4. According to the previous Netherlands Patent Application 7,206,378 corresponding to U.S. Patent application Ser. No. 345,644, filed Mar. 28, 1973 in the name of Applicant, the positioning device comprises a radiation source and a radiation-sensitive detection system for converting the radiation which is supplied by the radiation source and which is reflected by the record carrier, into electrical signals, the radiation source supplying three beams for the formation of three radiation spots on the surface of the track part to be read, the dimensions of the said radiation spots corresponding to the smallest detail in the optical structure, the positions being different, viewed in the transverse direction of the track, at least one radiation-sensitive detector being provided for each beam. By comparison of the electrical signals supplied by the detectors which are arranged in the beam paths of the outer beams, it can be established whether or not the center beam (the read beam) is properly directed with respect to the track. It is advantageous if the center of at least one of the outer beams, viewed in the transverse direction of the track, intersects the plane of the track part to be read at an acute angle; the position of this plane with respect to the radiation-sensitive detection system can then also be determined. Use is made of the fact that the position where the center of an inclined beam intersects the plane of the track changes when this plane is moved.

So as to enable reading, it must be ensured that the read beam images on the detector only an area of the record carrier having approximately the dimensions of the smallest detail in the optical structure. In addition, it must be ensured that the axis of the read beam always intersects the plane of the track at the center of this track.

Figures 6A, 6B:
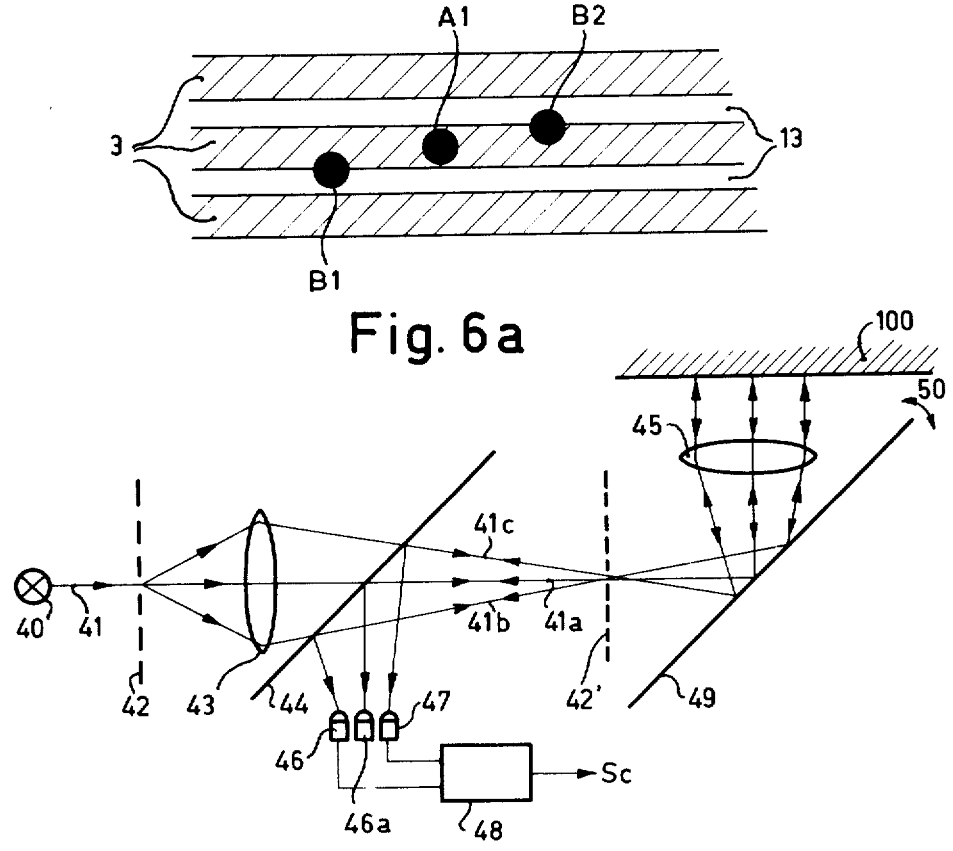
FIG. 6A and 6B show position devices.

FIG. 6a illustrates how the position of the read beam can be detected with respect to the track. In addition to a light spot A1, in the center of a track 3, two light spots B1 and B2 are also projected on the edge of the track. Spot A1 is the cross-section of the read beam at the area of the track. This spot is imaged on the high-frequency information detector. The distances between light spots A1 and B1 and between the light spots A1 and B2 are equal and constant. B1 and B2 move together with A1 in the same direction and over the same distance. When spot A1 is situated at the center of track 3, the two detectors on which the spots B1 and B2 are imaged receive the same quantity of radiation. If the center of A1 does not coincide with the center of the track to be read, the intensity of the radiation beams incident on these detectors is different. The extent and the direction of a deviation between the read beam and the track to be read can be determined by comparison of the value of the electrical signals supplied by the detectors.

FIG. 6b shows how the three light spots can be formed on the record carrier 100. The beam 41 which is supplied by a radiation point source 40 is incident on a phase raster 42. This phase raster can be adapted such that the beams of higher order than the first are suppressed. The phase raster 42 forms three deflection images of source 40 by way of the beams 41a, 41b and 41c, only one ray of said beams being shown. A lens 43 forms an image 42 of the raster in the focal plane of a lens 45. The parallel beams formed by the lens 45 are incident on the record carrier 100 in different locations, viewed in the longitudinal direction of the track. So as to achieve that two light spots are projected onto the edge of the track to be read, the raster lines, when projected in the plane of the track to be read, must enclose an acute angle with the direction of the track. The beams reflected by the record carrier are reflected by the semi-transparent mirror 44 to the detectors 46a, 46 and 47. So as to avoid moire effects, the raster 42 may not be passed twice. Therefore, this raster is arranged in front of the semi-transparent mirror 44.

Detector 46a is the high-frequency information detector, detectors 46 and 47 being auxiliary detectors which are active in the determination of the position of the read beam with respect to the track to be read. The signals originating from the detectors 46 and 47 are applied to an electronic unit 48 in which a control signal $S_c$ is derived from these signals in known manner. By means of this control signal, the position of a tilting mirror 49 can be varied such that the light spot A1 is always projected onto the desired part of the record carrier.

The above system is very suitable when the preferred positions and recesses are present on the same track. For the light spots B1 and B2 reflection takes place on the upper side of the plate of magnetic material. The detection of the domains is effected by means of light which reflects on the lower side of the layer of magnetic material. The use is known of phase plates for the selective filtering of light which is reflected on either the upper or the lower side of the plate respectively. It is alternatively possible to use a first wavelength of the light for the detection of domains, and light of a second wavelight for the positioning. The light spots of the second wavelength are then sharply imaged on the upper surface of the plate of magnetic material, so that the reflection is substantially influenced by the presence of the recesses. The imaging of the light of the first wavelength is effected on the rear side of the plate of magnetic material, and is hardly influenced by the recesses.

Another possibility is to arrange the two auxiliary beams 20 such that they are incident on the positioning tracks of the cases (c) and (d) of FIG. 4. The spacing between two light spots is then much larger. In case d) there can then be 2×2 positioning light spots, i.e. one for the case that the positioning track is read, and one for the case that a track containing only information is read. A plurality of read beams can be active on adjoining tracks.

The addressing of a track can be effected in that the control unit CONTR2 (FIG. 5) receives information from the position-determining unit SE, the said information originating, for example, from the light reflected by the positioning tracks. When a positioning track is passed, the quantity of reflected light decreases, which can produce the addressed track number when use is made of a detector and a counter. A predetermined track can thus be addressed in that the counter position is compared with predetermined information.

Figure 1:
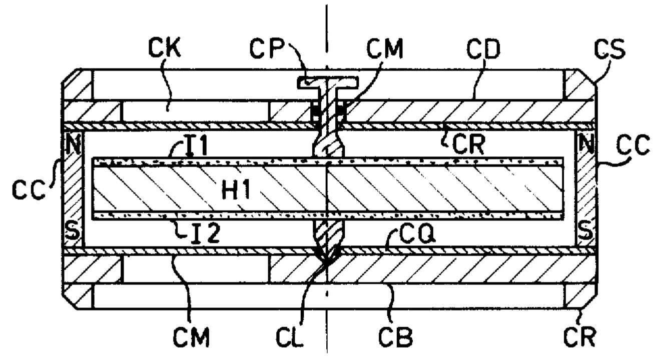
FIG. 1 shows a "bubble cassette disk"

FIG. 1 shows a "bubble cassette disk" according to the invention and comprises a storage disk with magnetic layerers I1, 2 on both sides in which domains can be formed on a further layer H1 which can inter alia comprise permanent magnetic layers. The storage disk is located in the bottom and lid of a cassette which can be evacuated so as to reduce the air friction. The cassette comprises a bottom CB with bearing CL, centering rings CR, CS, a lid Cd with passage bearing CM and a cylinder jacket CC at its side-wall, the latter consisting of a permanent magnet (poles N/S). Also present is a mechanically or electrically drivable pulley CP. Bottom and lid comprise a plate CQ, CR of permalloy, with the result that the field of the magnetic wall CC can be applied to the interior of the cassette so as to form a stabilization field. Bottom, lid and sidewall can be specially profiled so as to increase the uniformity of the magnetic field. The lid and bottom comprise openings CK, CM to allow passage of the light from source LASER: in the rest position, for example, these openings can be closed by a lid (less heavy shading). The cassette can alternatively be contained in a permalloy outer cassette (not shown) in order to screen stray fields.

What is claimed is:

1. A storage system comprising a plate of magnetic material in which digital information can be stored in the form of domains, a plurality of magnetically active elements for determining a number of domain positions, write means from storing domains under the influence of thermal action of electromagnetic radiation, means for maintaining a magnetic bias field whose magnitude determines the domain dimension, the improvement wherein said plate is located on a rotatable disk, drive means for rotating said disk at a substantially uniform speed, said write means including read means for retrieving said information by electromagnetic radiation, and positioning members for selectively addressing the radial position of a domain on said disk.

2. A storage system as claimed in claim 1, wherein said plate comprises recesses in the layer of magnetic material which form, together with said positions, a regular array which is arranged according to at least substantially circular tracks, said recesses being arranged according to centering tracks, centering means being provided by means of which electromagnetic radiation can be projected on said centering tracks and can be detected after reflection.

3. A storage system as claimed in claim 1, wherein said positioning means comprises a logic member, means for supplying said reflected electromagnetic radiation to said logic member, said radial position being addressable by said logic member.

4. A storage system as claimed in claim 1, wherein said means for maintaining a magnetic bias field comprise a layer of permanent magnetic material which is provided on said plate of magnetic material.

5. A storage system as claimed in claim 1, wherein said magnetically active elements contain dot-like soft-magnetic material which is deposited on the plate of magnetic material.

6. A storage system as claimed in claim 1, wherein the operating temperature of said plate of magnetic material is below its compensation temperature, characterized in that said write means comprise a preheater and a light source which can be modulated, the said light source not being capable but light source and preheater together being capable of locally raising the temperature to the compensation temperature.

7. A storage system as claimed in claim 1, wherein the operating temperature of said plate of magnetic material lies below its compensation temperature, characterized in that said write means comprise a magnetic field generator and a light source which can be modulated, in which the temperature of the plate of magnetic material can be locally increased to the compensation temperature which is dependent of the magnet field strength by cooperation of the additional magnetic field generated by the magnetic field generator, which counteracts the magnetic bias field, and the radiation of said light source.

8. A storage disk to be used in a storage system as claimed in claim 1, wherein the storage disk can be removed from the storage system together with means incorporated therein for maintaining a magnetic bias field, the storage disk comprising mechanical centering means which can cooperate in a centring manner with non-removable second centering means of the storage system.

9. A storage cassette to be used in a storage system as claimed in claim 1, wherein it can be removed from the system, together with means for maintaining a magnetic bias field in the interior thereof which are incorporated therein, and that it contains a storage disk in which domains can be formed.

* * * * *

UNITED STATES PATENT AND TRADEMARK OFFICE

CERTIFICATE OF CORRECTION

PATENT NO. : 3,905,040

DATED : September 9, 1975

INVENTOR(S) : MATTI NIILO TAPANI OTALA

It is certified that error appears in the above-identified patent and that said Letters Patent are hereby corrected as shown below:

ON THE TITLE PAGE

Section [75] Inventor "Nillo" should be --Niilo--;

IN THE SPECIFICATION

Col. 2, line 8, "what" should be --that--;

Col. 3, line 65, "tring" should be --tering--;

Col. 4, line 8, "alwways" should be --always--;

Col. 6, line 53, "This" should not be a new paragraph;

IN THE CLAIMS

Claim 3, line 1, "1" should be --2--;

Claim 8, line 6, "centring" should be --centering--;

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*